Jan. 26, 1971  A. E. B. REJMINGER  3,557,547
DIALS FOR STOP WATCHES

Filed July 2, 1968  3 Sheets-Sheet 1

INVENTOR:
ANDERS ELIS BERNHARD REJMINGER
by
Browne, Schuyler + Beveridge,
Attorneys United States Patent Office 3,557,547
Patented Jan. 26, 1971

3,557,547
DIALS FOR STOP WATCHES
Anders Elis Bernhard Rejminger, 15 Knektgatan,
Linkoping, Sweden
Filed July 2, 1968, Ser. No. 742,022
Int. Cl. G04f 7/04
U.S. Cl. 58—74                                    4 Claims

ABSTRACT OF THE DISCLOSURE

A stop watch dial having two or more concentrically arranged scales for indicating an estimated time spent in covering a given normal distance, and the scales are so graduated that with the aid of the watch hand one can read the time spent in covering the distance or the speed. The dial permits directly reading the estimated speed or time per normal length unit and simultaneously it indicates the size of the deviation from a given ideal speed or time for the normal length unit. The dial is suited for use in measuring speeds or the time spent in covering distances at races over given distances, and the scales of the dial are so graduated that, when the watch is stopped after a short or long distance has been covered, the speed and time, respectively, for the normal distance or normal length unit common to the two scales can be directly read.

---

This invention relates to a dial for stop watches which has two or more concentrically arranged graduations for indicating in conjunction with the watch hand the estimated time spent in covering a given normal distance, for example 1 kilometer or 1 English mile.

Stop watches having a number of speed graduated scales have already been suggested. In these stop watches, however, the scales are not uniform and can therefore be difficult to read by unskilled persons. Besides, the possibilities of using scales graduated directly in speed are not very great. Thus it is not possible with such a scale without further facilities to read how long a time one needs to catch up an earlier loss of time occasioned by too low an initial speed.

These disadvantages are eliminated by the dial according to the invention in which the graduations can be made uniform and thus more easily readable. With the aid of the improved dial according to the invention it is also easy to correct a speed in order to obtain a desired result. The characteristic features of the invention reside in that the scales which are intended for use in covering a given short or long distance, are individually graduated in such a way that when the watch is stopped after the respective distance has been covered, the time for the normal distance common to the scales can be directly read.

For better elucidation the invention will be described more in detail in the following with reference to the accompanying drawings illustrating two embodiments of the device.

Figure 2:
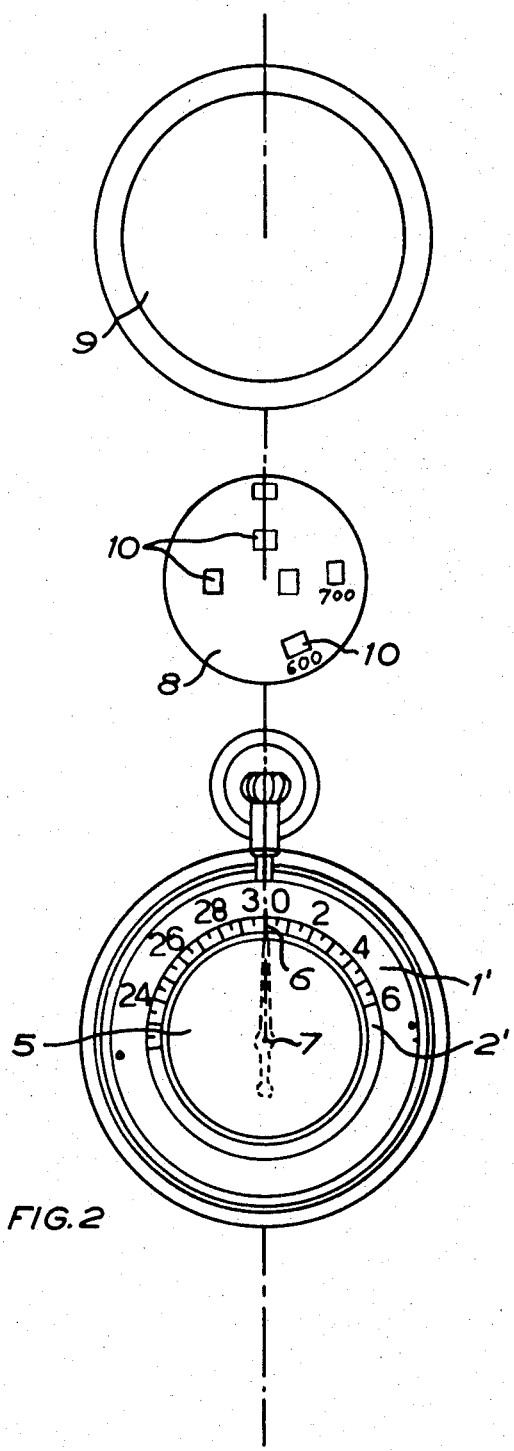
FIG. 2 shows a view of a stop watch in which a modified embodiment of the improved dial is utilized.
Figure 3:
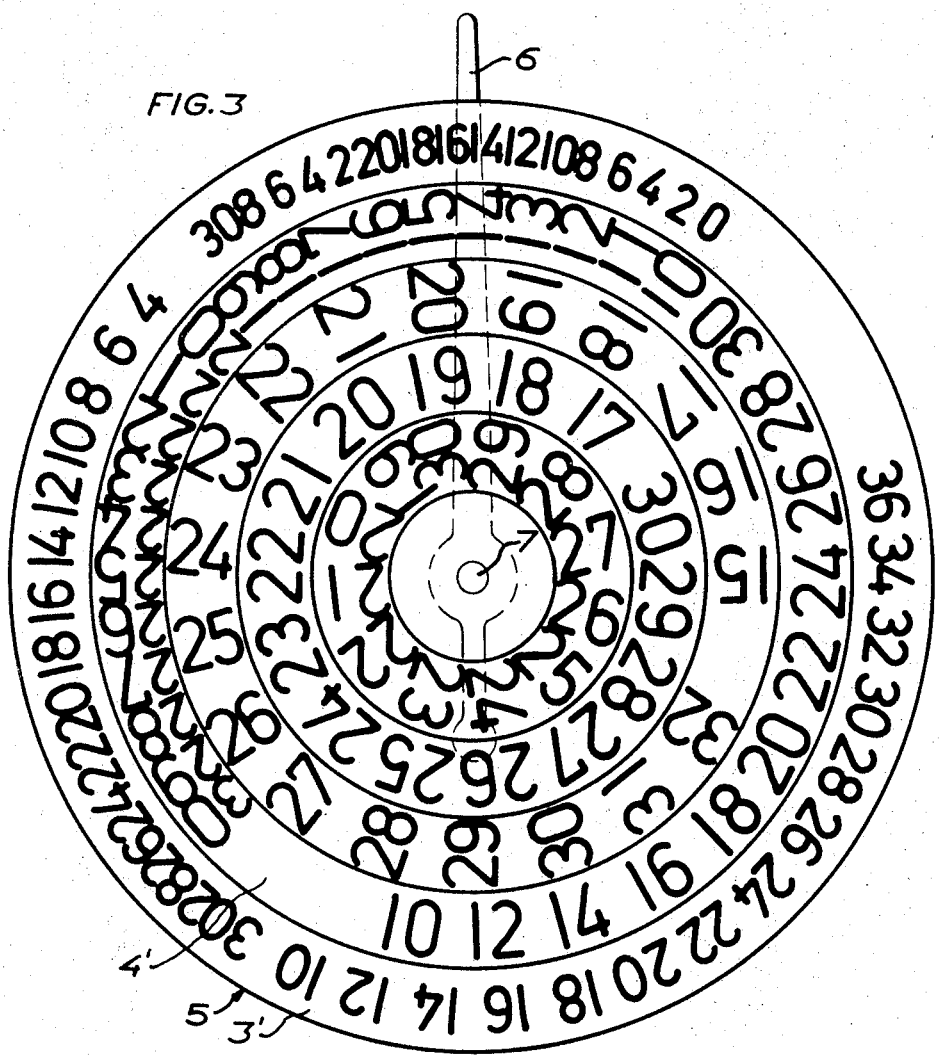

FIG. 3 on a larger scale shows the numeral plate in the stop watch of FIG. 2, which rotates together with the watch hand.

The dial comprises a number of circular scales of which the two outermost ones are ordinary scales graduated in seconds, a full revolution corresponding to 30 seconds. Inwardly of these graduations there is a number of annular scales 3, 4 which for a number of different distances give the time per kilometer for the distance covered at a certain speed. For example, the scale 3 having the numerals 10, 15, 20 and 25 relates to the distance 400 meters and the numerals indicate the time per kilometer over 1 minute.

A dial according to the invention is useful for example in trotting where one often wishes to know the speed of the trotting horses. This usually implies the average speed of the trotters over a given distance. As a measure of the average speed use is made of the time spent in covering 1 kilometer or 1 English mile.

For training purposes trotters mostly are driven over distances of 200 meters and by even hundreds up to 1,000 meters; sometimes also longer distances occur, such as 1,600, 1,700, 2,100, 2,200, 2,600, 2,700, 3,000 meters. It is imperative to learn the time per kilometer of the horses when timing takes place over distances other than 1,000 meters.

For this purpose use can be made of the dial according to the invention. This dial has the advantage that the time per kilometer is obtained swiftly and mostly without any calculations or without any searching in tables being necessary. For trainers who sitting in the sulky want to know the kilometer time in the course of the training a stop watch equipped with a dial in accordance with the invention is an excellent aid.

The dial can be mounted on a stop watch of conventional construction. Every distance for which it is desired to know the kilometer time, has its own circular ring. Several short distances, however, can be accommodated in one and the same annular scale. The scales for the long distances are located to the innermost rings and those for the short distances are located outermost, which provides the greatest exactitude. For easier reading the dial can be given different colors.

As mentioned above, yards and miles can be indicated instead of meters and kilometers.

An experiment will show that it is rather difficult during a race to calculate how much the speed must be increased in order to catch up on competitors. This is much easier when use is made of the kilometer time. A comparison between the kilometer times will permit an immediate estimation of how many units of time have to be caught up. The improved dial makes it possible, after covering but a relatively short distance, to establish whether the current speed suffices to so catch up.

Figure 1:
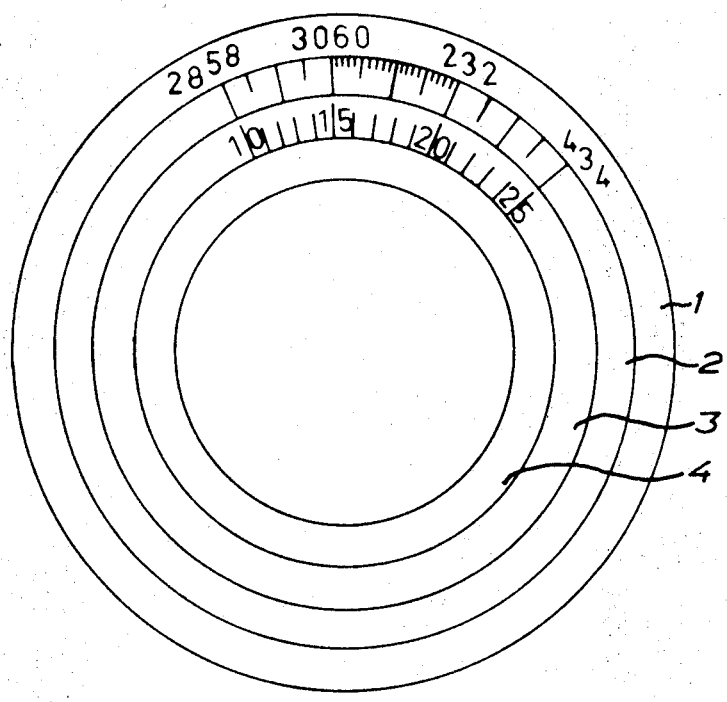
FIG. 1 shows an embodiment of a dial according to the invention with a graduation indicated in part.

As will appear from FIGS. 2 and 3 the dial can also be otherwise designed. Like in date-indicating watches the plate 5 and the scales thereon can be arranged for mounting on the shaft 7 of the watch hand 6 so that the plate will rotate. The graduation of the plate remains fundamentally the same as was described in connection with FIG. 1, the only difference being that the numerals occur in the reverse order. On top of the rotary plate 5 there is placed a stationary disk or masking disk 8 which may suitably be associated with the watch glass 9 and has small windows 10 for reading. By suitable displacement of the various scale graduations these windows may be grouped in suitable ways in relation to each other. In the cases where the same ring comprises graduations for several different distances the numerals as shown on the scale 4' in FIG. 3 can be oriented in different directions to facilitate distinction between the scale parts. The window where the kilometer time or the speed for the respective covered distance is to be read is preferably provided with an index 11 (as is also indicated in FIG. 2) which can be the numerals corresponding to the distance concerned. These numerals are oriented in such a way as to correspond to the numerals indicated on the scale part applicable to the respective window.

What I claim and desire to secure by Letters Patent is:

1. In a stop watch having a first scale graduated to read in seconds; a second scale having graduations in units of time per distance for a predetermined distance course, means for reading said second scale, a number of additional scales having graduations in units of time per distance similar to said second scale but covering different predetermined distance courses, said second scale and at least one of said additional scales being arranged in the same annular path with the graduations in said second scale oriented in a different direction than the graduations in said one additional scale to facilitate distinction therebetween.

2. The combination defined in claim 1 wherein a plurality of said scales are colored differently to facilitate distinguishing therebetween.

3. In a stop watch having a first scale graduated to read in seconds; a second scale having graduations in units of time per distance for a predetermined distance course, means for reading said second scale, said first scale extending annularly about the watch, a rotatable watch hand for sweeping over the graduations in said first scale to indicate the seconds thereof, a first plate containing said second scale rotatable with said watch hand, and a second stationary masking plate fixed over said first plate and having an opening for reading the graduations of said second scale.

4. The combination defined in claim 3 wherein there is further included at least one additional scale on said second plate having graduations in units of time per distance similar to said second scale but for a different predetermined distance course, and wherein said second plate has an additional opening for reading said third scale, the graduations in said second and third scales having different orientations, and wherein said second plate has indices adjacent said openings respectively and oriented in the same direction as the graduations associated therewith.

References Cited

UNITED STATES PATENTS

| | | | |
|---|---|---|---|
| 1,059,985 | 4/1913 | Finster et al. | 58—74 |
| 1,572,884 | 2/1926 | Colvin | 58—126 |

FOREIGN PATENTS

| | | | |
|---|---|---|---|
| 815,211 | 7/1937 | France | 58—127 |
| 165,551 | 11/1933 | Switzerland | 58—126 |
| 206,476 | 8/1939 | Switzerland | 58—126 |
| 2,338,897 | 8/1944 | Switzerland | 58—126 |

RICHARD B. WILKINSON, Primary Examiner

G. H. MILLER, Jr., Assistant Examiner

U.S. Cl. X.R.

58—126